United States Patent [19]

Rognon

[11] 4,040,301
[45] Aug. 9, 1977

[54] CONTROL DEVICE SENSITIVE TO SPEEDS IN EXCESS OF A PRE-DETERMINED ROTATION SPEED

[76] Inventor: Armand Rognon, 22 rue Geo-Lufbery, 02300 Chauny, France

[21] Appl. No.: 665,616

[22] Filed: Mar. 10, 1976

[30] Foreign Application Priority Data

Mar. 27, 1975 France .................. 75.09627

[51] Int. Cl.² .......................... G05G 17/00
[52] U.S. Cl. ................................. 74/3
[58] Field of Search .................... 74/3, 3.2
[56] References Cited

U.S. PATENT DOCUMENTS

| | | | |
|---|---|---|---|
| 960,411 | 6/1910 | Samuelson | 74/3 |
| 1,074,879 | 10/1913 | London | 74/3 X |
| 1,076,472 | 10/1913 | Wilkinson | 74/3 |
| 1,728,042 | 9/1929 | Caughey | 74/3 |
| 2,027,848 | 1/1936 | Warner | 74/3 |
| 2,317,812 | 4/1943 | Schmid | 74/3 |
| 2,831,671 | 4/1958 | Leonard | 74/3 X |

Primary Examiner—Allan D. Herrmann
Attorney, Agent, or Firm—Marmaduke A. Hobbs

[57] ABSTRACT

A control device sensitive to speeds exceeding a pre-determined rotation speed, characterized in that it comprises a mobile locking ring for a driving organ, resiliently returned to the locking position, a sleeve freely rotating inside said ring at a speed linked to the speed to be controlled, and comprising at least a peripheral flyweight, returned to its rest position by a calibrated spring, and mounted in such manner as, under the action of the centrifugal force created by said pre-determined rotation speed and against the action of the return spring, to engage with the inner surface of the ring, in order to cause it to leave its locking position.

2 Claims, 2 Drawing Figures

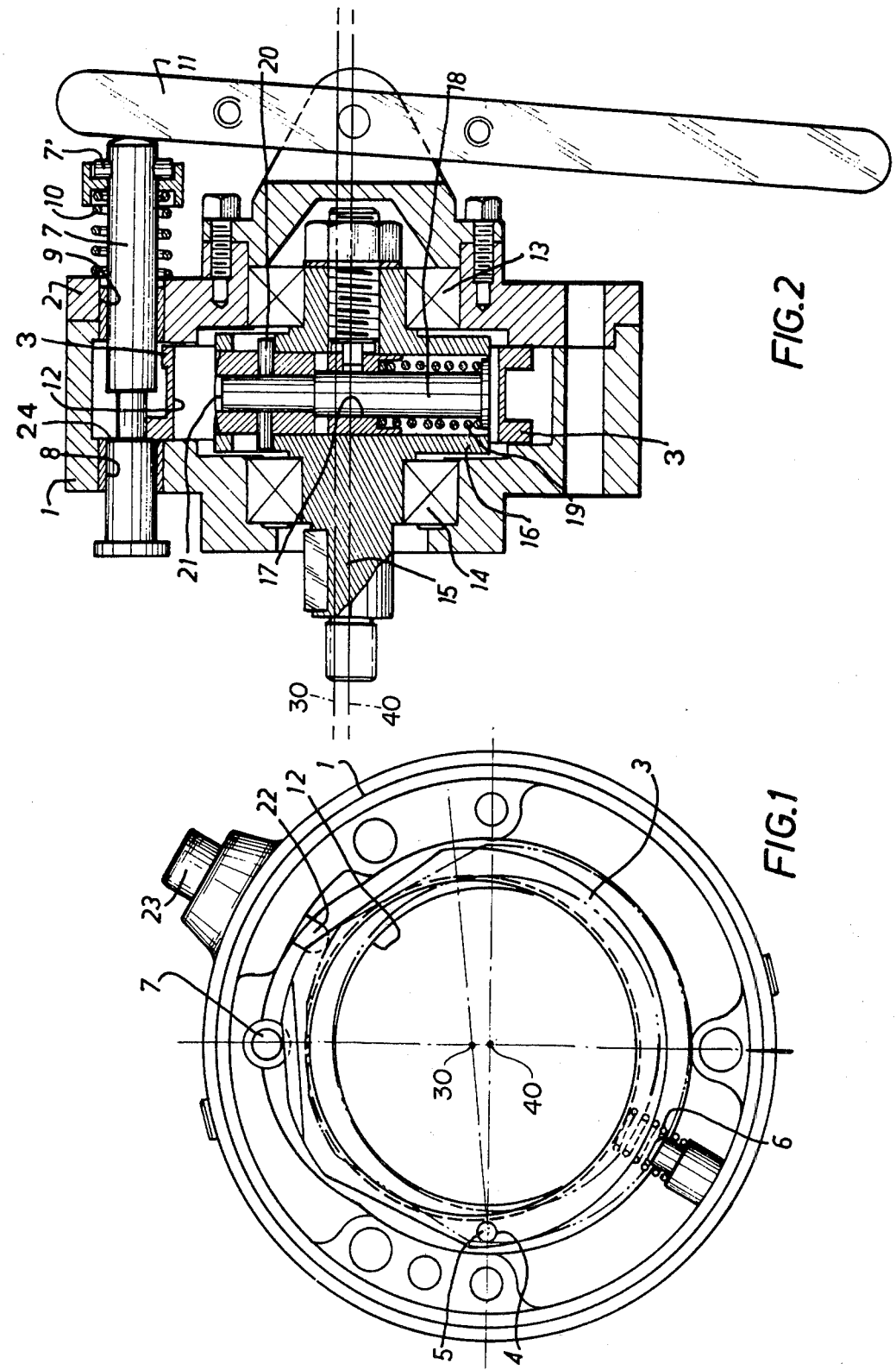

CONTROL DEVICE SENSITIVE TO SPEEDS IN EXCESS OF A PRE-DETERMINED ROTATION SPEED

The invention relates to a control device sensitive to speeds in excess of a pre-determined rotation speed, for instance a safety device causing a locking or unlocking of a feeding organ for an internal combustion engine when this engine reaches a pre-determined rotation speed, in such manner that it stops the engine.

Usually such a drive is provided by means of a speed sensor which produces a driving signal as soon as the foreseen speed is reached. Such sensors are expensive and the unit needs an electrical supply which is not always available and moreover may be dangerous in cases where the engine runs in an explosive or combustible atmosphere.

The object of the invention is to provide results extremely safe and repetitive, by means of a device purely mechanical, simple, robust and cheap.

To this effect, the device according to the invention comprises a mobile locking ring for a driving organ, returned resiliently to its locking position, a sleeve freely rotating inside said ring at a speed linked to the speed to control and comprising at least a peripheral fly-weight, returned to its rest position by a calibrated spring and mounted in such manner as, under the action of the centrifugal force created by said pre-determined rotation speed, and against the action of its return spring, to cooperate with the inner surface of the ring in order to cause it to leave its locking position.

Owing to such an arrangement, the driving organ under consideration is locked by the ring as long as the rotation speed of the sleeve does not exceed a certain value. Beyond this value, the ring releases the driving organ.

In an embodiment of the device according to the invention, the ring is pivotally mounted about an axis parallel to the axis of rotation of the sleeve.

The ring could also be slidingly mounted.

In another embodiment, said ring has an inner cylindrical surface, the sleeve is cylindrical and excentered in relation to the axis of the inner surface of the ring.

The device according to the invention can advantageously include manual means arranged in such manner as to displace the ring, and as a result to check the right operation of the device.

The invention will be better understood with the aid of the herebelow detailed description of a particular embodiment of the device according to the invention, the description being made with reference to the accompanying drawings in which:

FIG. 1 is a view of the ring accommodated in the housing of the device according to the invention, and FIG. 2 is a sectional axial view of the device according to the invention.

In the embodiment represented on the drawing, the device comprises a basin-shaped housing 1 closed by a lid 2. A ring 3, in which a bore 4 has been made, can pivot about a pivot 5, integral with housing 1 and extending through bore 4. A return spring 6, pressed on the inner wall of housing 1, repels ring 3 in contact with a bolt 7 extending through the bottom of housing 1, through a bore 8, and the lid 2, through a bore 9, bolt 7 being held by a pin 7'. In the position represented on the drawing, ring 3 is excentered in relation to the axis of housing 1 and, pressing against shoulder 24 of bolt 7, maintains bolt 7 in a locking position.

When ring 3 sets free shoulder 24 of bolt 7, bolt 7, under the action of spring 10 to which it is secured, tilts a driving lever 11 against an end of which it rests. Lever 11 can control the supply of an internal combustion engine.

The inner surface 12 of ring 3 is cylindrical. In housing 1, rotating on two ball bearings 13 and 14, respectively mounted in a bore of lid 2 and in a bore at the bottom of basin 1, is mounted a shaft 15, one end of which is integral, eventually through a demultiplying device, with the organ whose rotation speed has to be controlled. Shaft 15 extends through the circular bore 12 of ring 3 and presents in this area an extra-thickness forming a cylindrical sleeve 16 which is such as, when shaft 15 turns and the ring is in its locking position against shoulder 24 of bolt 7, ring 3 with its axis 30, is excentered in relation to the axis 40 of shaft 15, but sleeve 16 does not touch bore 12. Sleeve 16 is formed with a radial bore 17 in which slides a fly-weight 18 returned to its rest position by a calibrated spring 19 and prevented from coming out of bore 17 by a pin 20. The calibrated strength of spring 19 is such that fly-weight 18 can overcome the action of the spring only from a pre-determined rotation speed of shaft 15. In this case, the free end 21 of the fly-weight 18 protrudes outside of sleeve 16 and, during the rotation of shaft 15, engages with circular bore 12 of ring 3. Ring 3 pivots then about pivot 5, tending to become concentric in relation to the 40 axis of shaft 15, which action sets free bolt 7 and moves lever 11.

The invention provides also a push button 22, in abutment on ring 3 and secured to a button 23 protruding outside of the peripheral edge of housing 1, this unit being returned by a spring not represented on the drawing. In the position shown on FIG. 1, where ring 3 locks bolt 7, a pressure on button 23 causes pivoting of ring 3 and, therefore, unlocking of bolt 7, in order to check the right operation of the safety device when driven by the previously described device.

In alternative embodiments of the device according to the invention, bore 12 of ring 3 and sleeve 16 could be otherwise than cylindrical.

What I claim is:

1. Control device sensitive to speeds exceeding a pre-determined rotation speed, comprising a mobile ring arranged for locking a driving organ, a means resiliently biasing said ring to its locking position, a sleeve freely rotating inside said ring at a speed linked to the speed to be controlled and provided with at least one weight, said sleeve being arranged in such manner as, under the action of the centrifugal force created by said predetermined rotation speed, to cause said ring to leave its locking position, characterized in that the sleeve is rotating around a fixed axis and that the weight is a peripheral fly-weight, biased to its rest position by a calibrated spring, and displaceably mounted within the sleeve in such manner as, under the action of said force, to engage with the inner surface of the ring to cause it to leave its locking position.

2. Device according to claim 1, wherein manual means are provided for displacing said ring and thus checking the right operation of the device.

* * * * *